US005787151A

United States Patent [19]

Nakatsu et al.

[11] Patent Number: 5,787,151
[45] Date of Patent: Jul. 28, 1998

[54] TELEPHONY BASED DELIVERY SYSTEM OF MESSAGES CONTAINING SELECTED GREETINGS

[75] Inventors: Kenneth Tsutomu Nakatsu, Caledon East; Michael Edward Brett; William Gerald Love, both of Ottawa; Suran Sam de Silva, Nepean; Jean Wu, Mississauga, all of Canada

[73] Assignee: Northern Telecom Limited, Montreal, Canada

[21] Appl. No.: 632,597

[22] Filed: Apr. 15, 1996

Related U.S. Application Data

[63] Continuation of Ser. No. 443,495, May 18, 1995, abandoned.
[51] Int. Cl.$^6$ ............................................. H04M 3/00
[52] U.S. Cl. .................................... 379/67; 379/88
[58] Field of Search ............................. 379/67, 88, 89, 379/69, 79, 92, 97

[56] References Cited

U.S. PATENT DOCUMENTS

| 3,728,486 | 4/1973 | Kraus | 179/2 |
|---|---|---|---|
| 4,932,021 | 6/1990 | Moody | 379/97 |
| 4,932,042 | 6/1990 | Baral et al. | 379/67 |
| 4,972,461 | 11/1990 | Brown et al. | 379/67 |
| 5,146,487 | 9/1992 | Bergsman | 379/88 |
| 5,251,251 | 10/1993 | Barber et al. | 379/89 |
| 5,333,180 | 7/1994 | Brown et al. | 379/89 |

OTHER PUBLICATIONS

IBM Systems Journal, vol. 23, No. 1 (1984), Armonk, New York, U.S., pp. 65-81, J.D. Gould et al. entitled "Speech Filing —An Office System for Principals".

*Primary Examiner*—Krista Zele
*Assistant Examiner*—Daniel S. Hunter
*Attorney, Agent, or Firm*—Jean-Pierre Fortin

[57] ABSTRACT

The invention constitutes a telephony based electronic voice greeting card service embodied within an adjunct processing system communicatively connected to a toll switching office of a public switched telephone network. The voice card system comprises a service controller, a storage node, an attendant controller and attendant services. The service controller is responsible for automatic processing of incoming and outgoing calls to provide the functionality for capturing new voice card messages, delivering voice card messages and status query of previously captured messages. The storage node provides a database of captured voice card message records, and the attendant controller in conjunction with the attendant services function to provide manual assistance to users. The voice card system allows a person, through use of a telephone, to create customized audio greeting cards by accessing various greetings through a comprehensive menu interface. The person is able to personalize a greeting by using their own voice to record a personal introduction and good-bye, and has flexibility in scheduling delivery of the greeting to a future point in time.

22 Claims, 9 Drawing Sheets

5,787,151

TELEPHONY BASED DELIVERY SYSTEM OF MESSAGES CONTAINING SELECTED GREETINGS

This is a Continuation of patent application Ser. No. 08/443/495, filed on May 18, 1995 by K. Nakatsu et al, for "TELEPHONY BASED DELIVERY SYSTEM OF MESSAGES CONTAINING SELECTED GREETINGS", now abandoned.

BACKGROUND OF THE INVENTION

The present invention generally relates to telephony based messaging systems and, in particular, to a system and a method of operating such system for delivering a message containing a selected greeting over a telephone network.

Traditional greeting cards are paper based products on which textual greetings that relate to special occasions are printed, for example, humorous wishes for birthdays, seasonal wishes at Christmas, "get well soon" wishes when a person is struck by illness and the like. Typically, a person aware of the pending special occasion must travel to a department store or specialty outlet to purchase an appropriate greeting card, write a personal message on the card, address its envelop with the postal address of the intended recipient, obtain and apply sufficient postage to the envelope, and lastly depend upon the postal service for timely delivery of the card.

The greeting card industry has recently adopted some electronic technologies. Kiosks that allow a user to produce personalized greeting cards dynamically are in use today. These kiosk typically include a touch-sensitive screen on which a hierarchy of menus relating to special occasions and various corresponding greetings are presented. The user cycles through the menus and alternative greetings offered to select a preferred greeting which the kiosk subsequently prints onto paper. Also, greeting cards exist that incorporate voice chip technology within the card thereby allowing the purchaser to record a personal voice message.

These existing technologies, however, still relate to paper based greeting cards which suffer from inherent disadvantages, for instance, inconvenience in terms of traveling to specific retail outlets and reliance on manual delivery. Moreover, the variant of the traditional card utilizing the voice chip technology is rather expensive.

Therefore, there is an apparent need for further technical progress in connection with greeting cards, especially with respect to providing convenient and economical alternatives for the consumer.

SUMMARY OF THE INVENTION

It is an object of the present invention to provide a new and improved system and method of operating such system for delivering a message containing a selected greeting over a telephone network.

The invention, therefore, according to a first broad aspect provides a method of operating a system for use with a telephone network to capture a message having a greeting for delivery to a recipient station connected to the network, comprising the steps of: receiving a call from a caller; presenting a plurality of greetings which may be accessed by the caller; selecting the greeting in the message from the plurality of greetings; receiving directory information of the recipient station from the caller; and delivering the message to the recipient station.

In accordance with a second broad aspect of the invention, there is provided a system for use with a telephone network to capture a message having a greeting for delivery to a recipient station connected to the network, comprising: a call manager for receiving a call from a caller; a first interface for presenting a plurality of greetings which may be accessed by the caller; a second interface for enabling the caller to select the greeting in the message from the plurality of greetings; a third interface for receiving directory information of the recipient station from the caller; and a delivery controller for delivering the message to the recipient station.

The invention constitutes a telephony based electronic greeting card (hereinafter referred to as a "voice card" or "VC") service embodied within an adjunct processing system which may be communicatively connected to a toll switching office of a public switched telephone network. The voice card system allows a person to create customized audio greeting cards according to a special occasion which may be tailored to an intended recipient, for example, seasonal greetings for children from special characters like the Easter Bunny or Santa Claus. In order to access the service, a user may dial a specific telephone number, such as a 1-800/900 or local number, which the telephone network routes in a conventional manner to connect to the system. The user will be greeted by the voice card service with an appropriate audio prompt and through a comprehensive menu interface, the user may access various greeting selections. Through the use of a touch tone phone and DTMF signaling or voice commands, the user will be able to step through the greeting selection process. Furthermore, during instances when a seasonal special occasion is approaching, such as in April when Easter is near, the voice card system upon welcoming the user may offer a choice of whether to advance directly to the menu of greetings relating to Easter or to the regular option menus. If the user does wish to send an Easter greeting, the selection process consequently may be simplified if the user chooses not to alter the default delivery date, specifically Easter day, and also because it is not necessary for the user to cycle through the hierarchy of menu options.

The user may record his/her name, the recipient's name, a personal introduction and also a personal good-bye which together with the selected pre-recorded greeting define a new personalized voice card message. Also, the user may schedule delivery of the voice card message either immediately or deferred to a specified date and time period, select a method of payment (i.e., regular billing, calling card, credit card, cash card) and input directory information of the recipient, typically the recipient's telephone number. Once the service has completed capturing the relevant information relating to the new voice card message, the system stores it in a database of voice card message records pending delivery.

When delivering a voice card message, the system dials the recipient's directory number which is routed through the public switched telephone network. If the destination end answers the call, the system introduces the voice card service and prompts that a voice card message awaits with the sender's and recipient's names being presented. The person answering the call may accept delivery if he or she is the intended recipient or otherwise may reject delivery in which case the system may automatically attempt re-delivery at a later time. Moreover, the person rejecting delivery may specify a time for the subsequent re-delivery attempt.

Another feature of the voice card system is that the sender may query it to confirm whether a previously captured message has indeed been delivered. If the previously captured message is still pending delivery, the system may offer the sender the option to cancel the voice card message.

The invention advantageously encompasses value to a user in terms of time savings, convenience, postal service charges and the time element in days for manual delivery of the card, and novelty. It provides a fully automated system that allows the user the simplicity of selecting and mailing an electronic voice greeting card by only accessing a telephone. Delivery of the greeting is effected more expediently and consequently ensures that the special event is not missed as may happen with late postage of traditional greeting cards. The user is able to personalize a greeting using their own voice and has flexibility in scheduling delivery of the greeting to a future point in time.

BRIEF DESCRIPTION OF THE DRAWINGS

The invention will be better understood from the following description of a voice card system together with reference to the accompanying drawings, in which.

DETAILED DESCRIPTION

Figure 1:
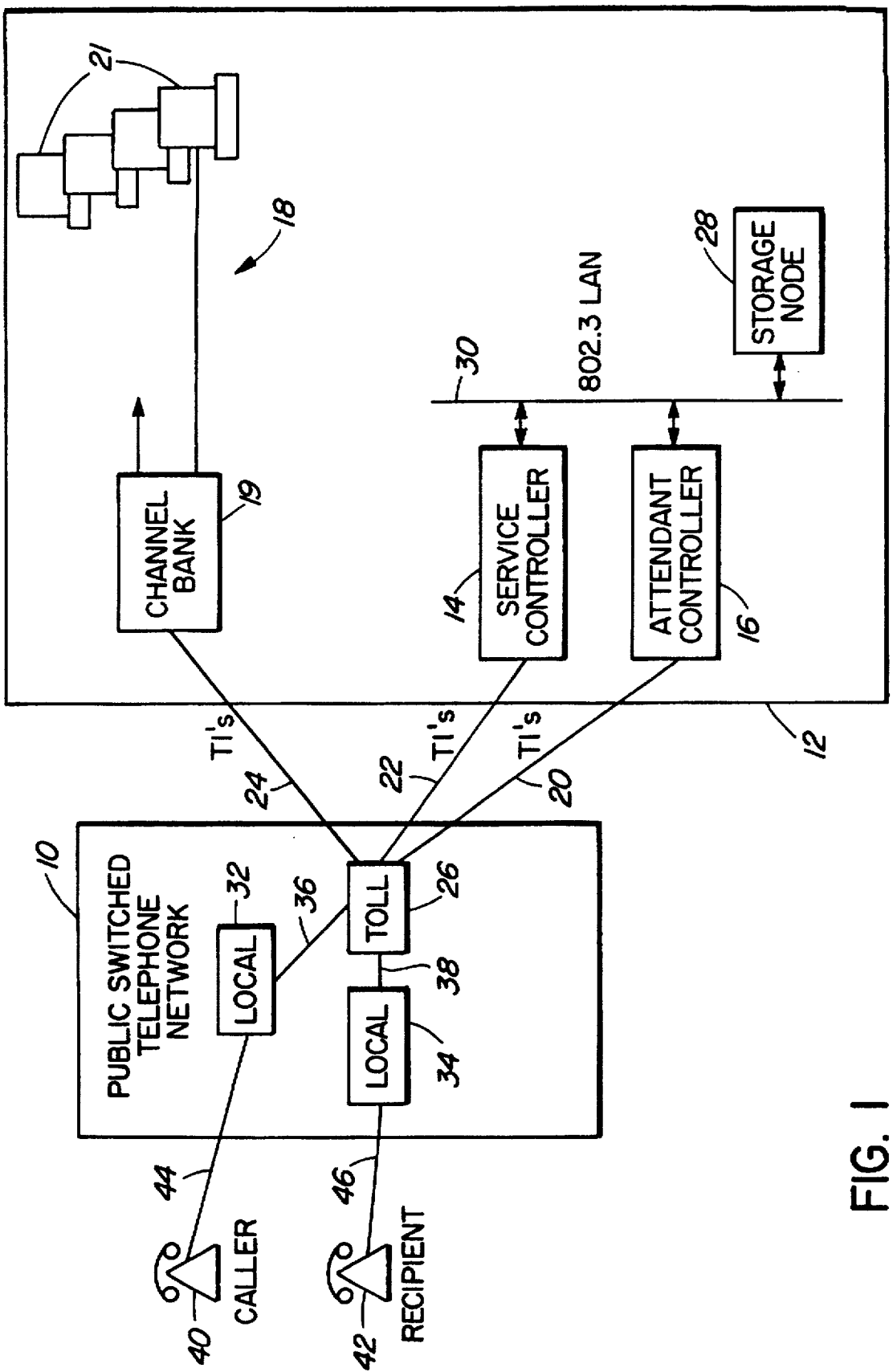
FIG. 1 is a schematic diagram of an embodiment of the voice card system connected to a public switched telephone network.

Referring to FIG. 1, illustrated is a representation of a public switched telephone network (PSTN) 10 communicatively coupled to which is a voice card system, in accordance with the invention, generally referred to by 12. The voice card system 12 comprises a service controller 14, and attendant controller 16 and attendant services 18, which are shown connected by conventional T1 links 20, 22 and 24, respectively, to a toll (class 4) switching office 26 within the PSTN 10. The attendant services 18 consists of a channel bank 19 which couples the multiple communication channels with the T1 link 24 to the various attendant stations 21. The system 12 also includes a storage node 28 which is coupled through a local area network 30 to both the service controller 14 and the attendant controller 16.

To facilitate an understanding of the operation of the voice card system 12 per se, the PSTN 10 is exemplified for simplicity as comprising two local (class 5) switching offices 32 and 34, which are connected by respective links 36 and 38 to the toll office 26 and to which telephone sets 40 and 42, respectively, are connected through corresponding subscriber lines 44 and 46. The telephone sets 40 and 42 may be touch tone telephones utilizing typical dual-tone multi-frequency (DTMF) signaling or rotary telephones utilizing dial pulse (DP) signaling. The voice card system 12, in the particular arrangement being describe and shown in FIG. 1, is connected to the toll office 26 which may be any class 4 switch in the PSTN 10. Class 4 switches are conventional devices having well-known characteristics that support certain features of the voice card system 12, namely relating to billing and attendant backing (i.e., operator assistance). However, it should be understood that these features constitute only part of the voice card system 12 and may be omitted in variant embodiments, in which case the voice card system 12 may be connected to any switch in the PSTN such as the class 5 local offices 32 and 34 or even as an end terminal. Northern Telecom's DMS-100 and DMS-200 digital switching products are typical class 5 and 4 type switches, respectively.

Within the voice card system 12, the service controller 14 is responsible for automatic processing of incoming and outgoing calls to provide the functionality for capturing new voice card messages, delivering voice card messages and status query of previously captured messages. The storage node 28 is provided for mass storage of the captured voice card messages and their related information, in the form of a database of voice card message records. The attendant controller 16 in conjunction with the attendant services 18 function to provide manual assistance to both callers and recipients when requested or under irregular circumstances which the service controller 14 is not able to process automatically.

Figure 2:
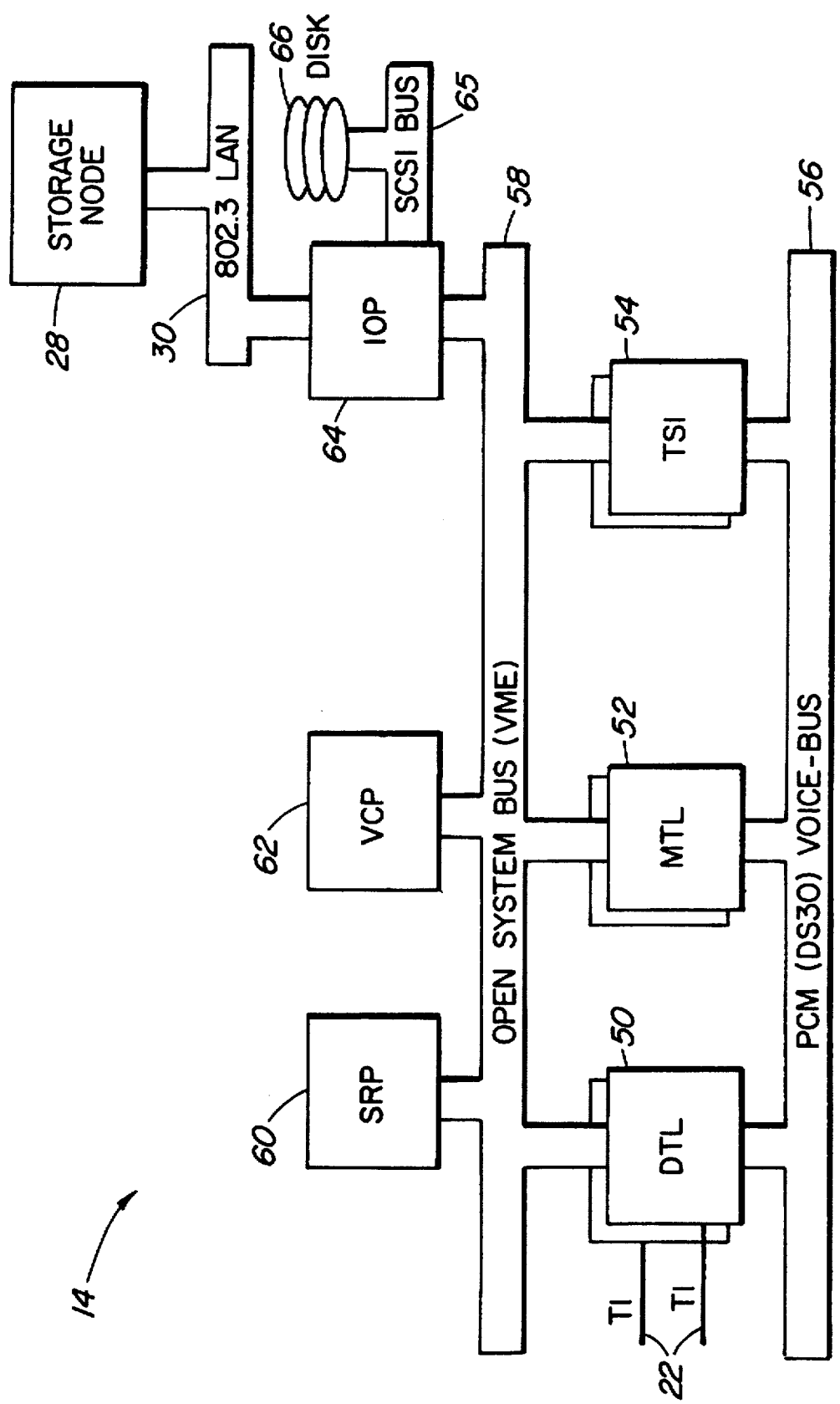
FIG. 2 is a schematic diagram of the internal structure of a service controller within the voice card system.

Turning to FIG. 2, the internal structure of the service controller 14 is shown comprising digital trunk link (DTL) units 50, multi-channel telecommunications link (MTL) units 52 and a time slot interchange (TSI) unit 54, which are coupled together through both a voice bus 56 and a data bus 58. Also coupled to the data bus 58 are a speech recognition processor (SRP) unit 60, a voice card processor (VCP) unit 62, and an input/output processor (IOP) unit 64. Entering into the DTL units 50 are T1 links 22 which are connected at their other ends to the toll switching office within the PSTN 10 (FIG. 1).

The voice bus 56 is typically a synchronous communication bus which carries digital voice and related data that has been encoded in a pulse code modulation (PCM) format. Transmissions over the voice bus 56 are time division multiplexed, in that utilization of the bus 56 is partitioned into time slots which are dynamically assigned to facilitate transfer of the PCM formatted data between the DTL units 50 and the MTL units 52. The data bus 58 is based on the VME open systems standard and allows the various components of the service controller 14, which constitute microprocessor based VME subsystems, to communicate.

As is well known, a Ti link is defined by a standard architecture consisting of twenty-four separate communication channels. Each DTL unit 50 provides an interface between the external communication channels within one T1 link 22 and the voice bus 56 internal to the service controller 14 and, in effect, couples the individual channels of the T1 link 22 to separate time slots on the data bus 56. Both voice and data may be carried over the channels within the T1 links 22. The voice channels are used to provide voice connectivity to calling and to called parties. The data channels, typically based on the X.25 protocol at the lower level, are used to transport commands and data, such as call handling requests, billing attributes and report commands. In one particular design of the service controller 14, for example, the twenty-four channels in each T1 link 22 may be utilized to support twenty voice channels and four data channels. The service controller 14, therefore, may have up to forty calls active which it processes concurrently. Northern Telecom's NTFX62AA is an example of a DTL unit 50.

The MTL units 52 provide a number of voice interface channels and a data interface channel serving as pipelines through which voice-band data may be passed between the VCP unit 62 and the voice bus 56. Each voice interface channel includes speech processing capabilities to support the interactive voice functions of speech playback and recording. To effect speech playback, a voice interface channel receives encoded speech from the VCP unit 62 over the data bus 58, decodes it, and plays it out over a time slot on the voice bus 56. To effect speech recording, a voice interface channel captures the digital voice signal present in a time slot on the voice bus 56, encodes it, and transfers it over the data bus 58 to the VCP unit 62. Furthermore, each voice interface channel has tone detection capabilities whereby DTMF inputs present on a voice bus time slot are detected and decoded. The data interface channel performs X.25 protocol encoding and decoding of messages transmitted over the data channels within the T1 links 22 to and from the toll office 26. An example of a MTL unit 52 is Northern Telecom's NTFX64AA.

The TSI unit 54 provides the functionality to dynamically switch the time slots on the voice bus 56 in order to establish effective communication channel connections between the MTL units 52 and the DTL units 50. Specifically, it communicates over the data bus 58 with a DTL unit 50 in order to allot each of the twenty four Ti channels entering the DTL unit 50 to a unique time slot on the voice bus 56, and with an MTL unit 52 to dynamically switch the assignment of an available voice interface channel within the MTL unit 52 to a specific time slot corresponding to a particular Ti voice channel over which a telephone call has been established. Similarly, the data interface channel within the MTL unit 52 may be dynamically assigned by the TSI unit 54, on an as needed basis, to a time slot on the voice bus corresponding to a T1 data channel at the DTL unit 50. Northern Telecom's NTFX65AA is an example of a TSI unit.

The SRP unit 60 provides speaker-independent speech recognition by utilizing flexible vocabulary recognition technology which is based on a phonemic analysis of words. Each word in the vocabulary is represented by a string of phonemes which constitute the word's phonemic transcription. The vocabulary may be multilingual in that it may contain words from several languages, such as, French, English and Spanish. Northern Telecom's NTFX78AA is an example of an SRP unit 60.

The IOP unit 64 is a microprocessor based device, running UNIX operating system software, which is connected through a conventional ethernet card to the LAN 30 and, additionally, through a small computer system interface (SCSI) bus 65 to a hard disk storage drive 66. The IOP unit 64 may receive, via the data bus 58, logs and operational measurements from the VCP unit 62 and stores such within a local database on the hard disk drive 66, and it also facilitates the transfer of voice card message records from the VCP unit 62 to the storage node 28. Furthermore, the IOP unit 64 functions as a service port through which administration personnel may communicate with the service controller 14 over the LAN 30 from a remote workstation to thereby download new greetings related data and control the operational status of the voice card system 12, for example, to put the system 12 out of service for maintenance purposes or back into service after repair.

Stored on the hard disk drive 66 are data files of prompts and greetings which contain a digitized form of the audio prompts presented to a caller interacting with the voice card system and the audio special occasion greetings available to the caller. Prompts are generally announcements that guide the user through the various menus of an interactive session and typically request input from the user. The greetings may be studio grade audio verses including music and perhaps famous celebrity voices and generally relate to a variety of special occasions. The prompts and greetings may also have multilingual versions, such as French and English. A further data file stored on the hard disk drive 66 lists the greetings available in the voice card system 12. This data file has multiple fields which contain various category and subcategory names relating to the special occasions and associated with which are fields for corresponding greeting names that identify the available audio verses. This data file includes a special occasion category field and special occasion date field which, respectively, store any valid special occasion category name and the date of that special occasion. The special occasion field is used to identify an occasion occurring in the near future, and may be left blank if such is not valid at a particular time during the calendar year.

The data files of digitized prompts and greetings and list of category and greeting names are generated externally of the voice card system and subsequently installed thereon. Prompts and greetings are typically recorded in a compression encoded format using a microphone hooked up to a conventional multimedia computer workstation running an audio recording system which produces a data file in the form of an indexable table. The list of category and greeting names data file may simply be a text file produced by an operator at the workstation: The workstation may be connected to the LAN 30 by which it may transfer these data files to the IOP unit 64 which in turn writes the files, via the SCSI bus 65, to the hard disk drive 66.

The VCP unit 62 is a microprocessor based real-time processing device operating under the instruction of application software which is specifically designed to implement the various aspects of the voice card service, namely the message capture, delivery and status query functionality. It also includes a hardware interface to the data bus 58, and a software interface supporting the X.25 protocol together with software driver routines to effect communications with the DTL units 50, MTL units 52, TSI unit 54 and SRP unit 60.

Figure 3:
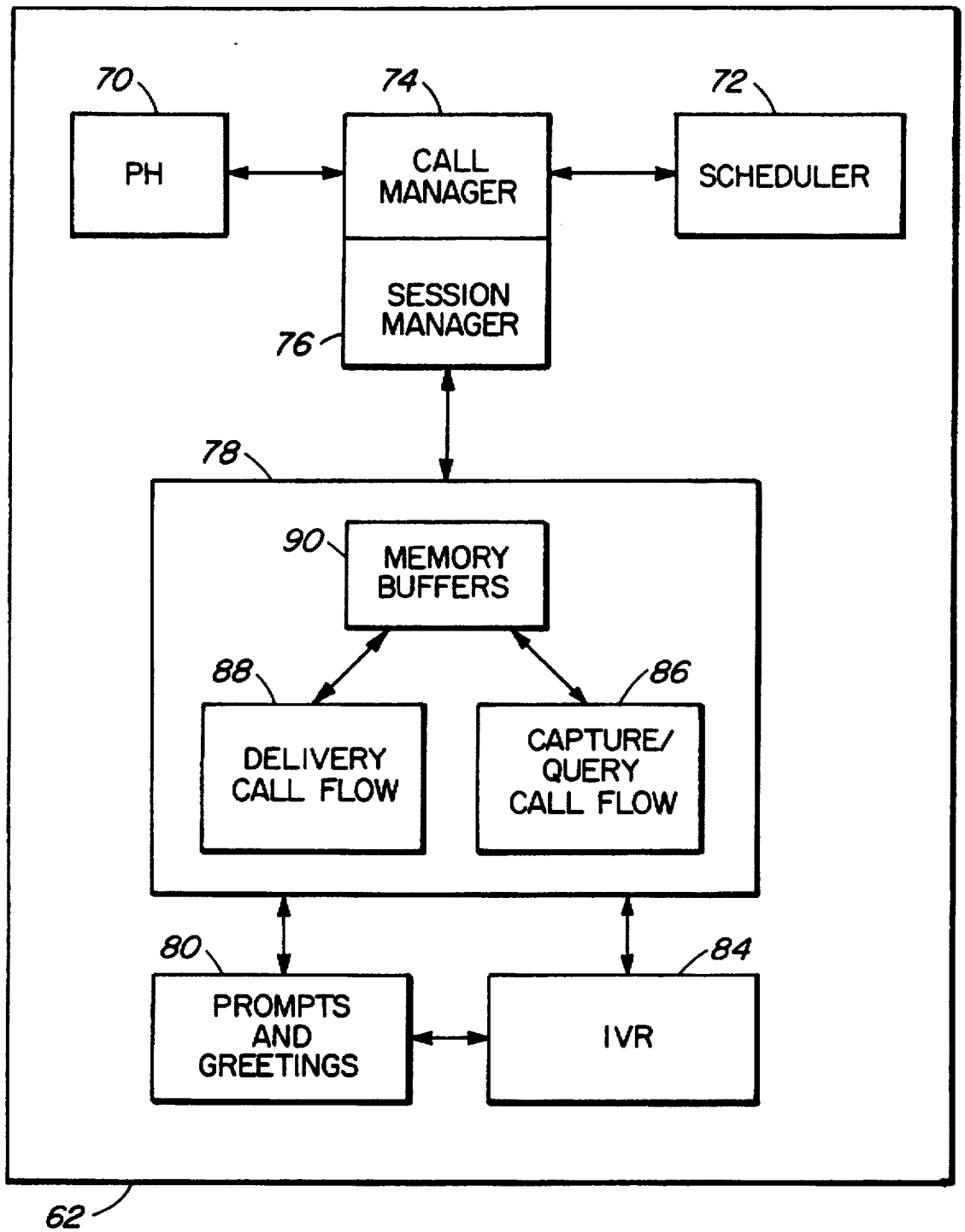
FIG. 3 is a graphical representation of the system architecture of a voice card processor unit within the service controller.

With regard specifically to the voice card application software, FIG. 3 depicts the various components defining its architecture which comprises a protocol handler 70, scheduler 72, call manager 74, session manager 76, resource objects 78, prompts and greetings memory 80 and an interactive voice response (IVR) process 84.

The resource objects 78 include a voice card capture/query call flow 86, a voice card delivery call flow 88 and memory buffers 90. The capture/query call flow 86 is the process whereby interaction of the voice card system with a caller is controlled. It implements a sequence of interactive steps with the caller to capture a new voice card message or to query the delivery status of a previously captured message. The delivery call flow 88 is the process whereby interaction of the voice card system with a recipient to deliver a captured message is effected. The memory buffers 90 are typical blocks of memory which are dynamically allotted to capture/query call flows 86 and delivery call flows 88 for utilization during their execution.

The protocol handler 70 functions as an interpreter to facilitate communications with the switching office to which the service controller is connected, by supporting the communication protocol of that particular switching office. The communication protocol of a class 4 switching office typically is unique to each manufacturer of such products and the protocol handler 70 represents a software component that may be configured as required to support communications with a specific manufacturer's product. In operation, the protocol handler 70 receives messages from the toll switching office over T1 data channels which are routed through the DTL units 50 in a time slot on the voice bus 56 and through the MTL units 52 over data bus 58 to the VCP unit 62. It translates the received messages and relays corresponding messages to the call manager 74.

The scheduler 72 is responsible for periodically querying the storage node 28 to determine whether there exists within its data base of voice card message records any such messages requiring delivery. For instance, at intervals of fifteen minutes the scheduler 72 may pass a conventional database query, to search for messages associated with a field having a status of undelivered and another field having a delivery date and time which are earlier than the date and time of the query. The database query is passed from the VCP unit 62 along the data bus 58 to the IOP 64 which in turn transmits the query over the LAN 30 to the storage node 28. The storage node 28 would search through the multiple records defining voice card messages and if any messages comply with the search parameters, it would return corresponding identifiers of these messages to the scheduler 72 who then notifies the call manager 74 accordingly.

The call manager 74, upon receiving notification of an incoming call from the protocol handler 70 or an existing voice card message to be delivered from the scheduler 72, coordinates assembly of the software resource objects 78 necessary to handle the particular event which includes initiating the appropriate call flow process of capture/query 86 or delivery 88, respectively, and allocating multiple memory buffers 90. Thereafter, the call manager 74 subsequently passes control to that call flow process. The session manager 76 is responsible for the actual allocation and deallocation of the resource objects 78 under direction of the call manager 74. It is noted that allocation of resources is effected on a per call basis, for both incoming and outgoing calls, whereby run-time instances of call flows are assigned. As forty voice channels are supported by the hardware configuration of the service controller, therefore, it is possible that up to forty call flow processes may execute concurrently in a single shelf.

The IVR process 84 functions as an intermediary facilitating communications between a caller or recipient and the corresponding capture/query call flow 86 or delivery call flow 88, respectively. It receives commands from call flows 86 and 88 to effect play of audio prompts and greetings, recognition of voice commands, DTMF input collection, and voice collection and playback, and in response thereto appropriately controls operation of the MTL units 52 and SRP unit 60.

The prompts and greetings memory 80 contains the digitized form of the audio prompts, the special occasion greetings, and the list of category and greeting names, the corresponding data files for which are initially found on the hard disk drive 66. At system initialization, the IVR process 84 requests the IOP unit 64 to read the prompts and greetings from the hard disk drive 66 and writes them into the prompts and greeting memory space 80. The list of category and greeting names will be read by the call flows via the IOP unit 64 during system initialization. These names will be used by the call flows to indicate to the IVR, during calls, which prompt or greeting to play.

The operation of the voice card service will now be described through illustration of a typical usage context, wherein a caller accesses the service to create a voice card message that is to be deliver to a particular recipient.

Referring back to FIG. 1, access to the voice card system 12 is effected in a conventional manner through the PSTN 10 which is briefly illustrated in the following. The system 12 would be associated with a virtual or real telephone directory number (DN) within the PSTN 10, for example, a 1-800-XXX-XXXX, 1-900-XXX-XXXX or possibly a local number. A person wishing to gain access to the voice card system 12, identified as a caller at telephone set 40, simply lifts the handset whereby a communication channel is established through subscriber line 44 to the local office 32 and dials the voice card system's DN. The PSTN 10 would then route the call from the local office 32 over link 36 to the toll office 26 at which the voice card system 12 is terminated.

The toll switching office 26 then interacts with the voice card system 12 and specifically the service controller 14 through a known convention. The toll office 26 transmits a message advising of an "incoming call" over an available data channel within the T1 link 22 to the service controller 14 which automatically answers the call whereby a connection is established with a particular voice channel in the T1 link 22. The "incoming call" message typically includes a record of call details such as the caller's telephone DN.

Turning to FIGS. 2 and 3, for the service controller 14 to initiate an interactive session with the caller, the DTL unit 50 channels the "incoming call" message from the T1 data channel over the voice bus 56 to MTL unit 52 which in turn forwards the message over the data bus 58 to the VCP unit 62. The protocol handler 70 within the VCP unit 62 receives the "incoming call" message and notifies the call manager 74 accordingly. The call manager 74 then requests the session manager 76 to initiate a new capture/query call flow 86 instance and allocate to it a sufficient amount of memory buffers 90, after which control of the call is transferred to that instance of the capture/query call flow 86 process.

Figure 4A:
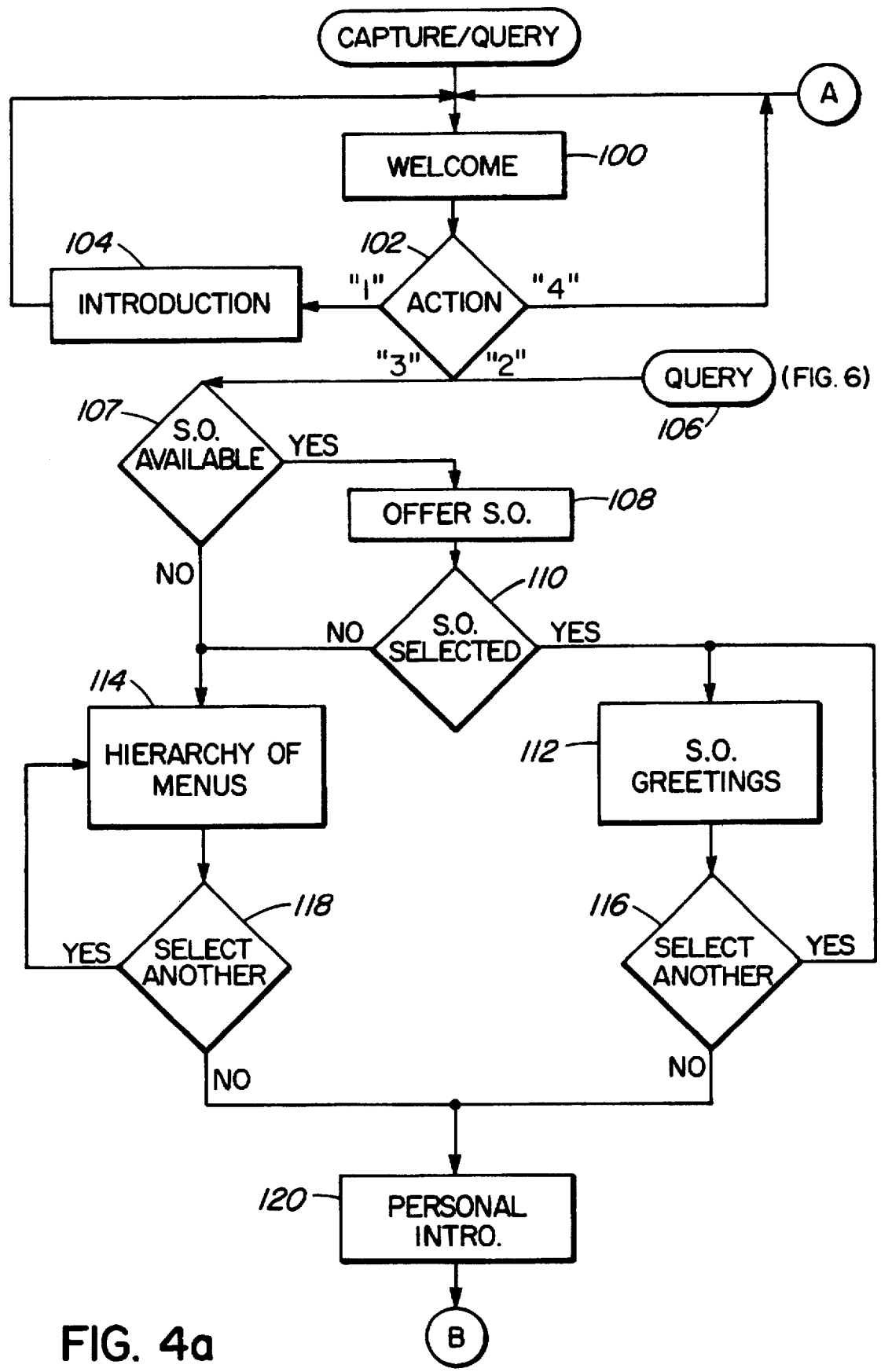
FIGS. 4a, 4b and 4c are a series of flow charts manifesting the method to capture a new voice card message.
Figure 4B:
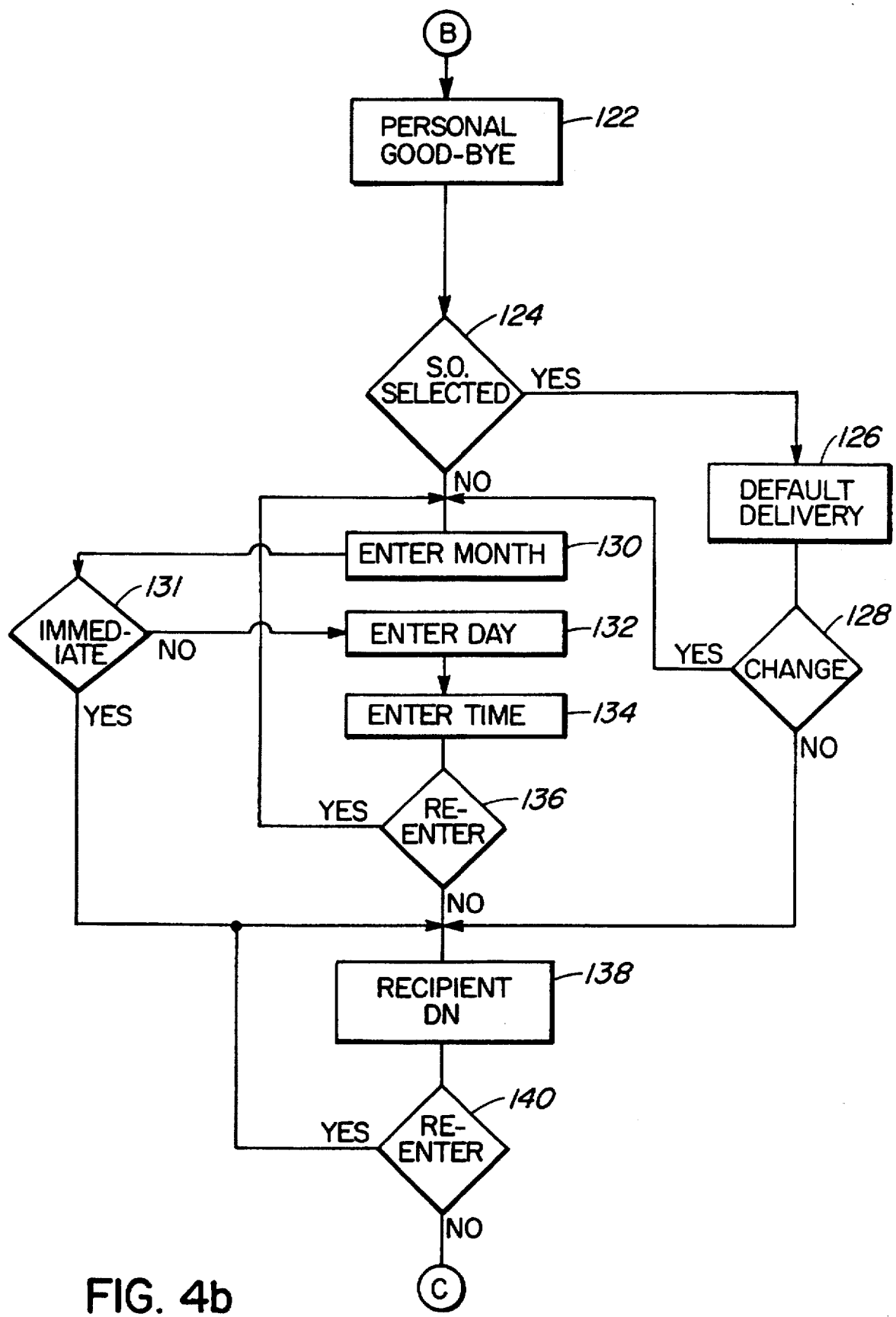

Referring also to FIG. 4, the capture/query call flow 86 begins interaction with the caller by first presenting a welcome prompt, in step 100, that requests the caller to input a selected course of action. The caller's input may be either DTMF signals or verbal commands. The capture/query call flow 86 provides an identifier associated with the welcome prompt together with an appropriate command to the IVR process 84 and waits for the results. The IVR process 84 retrieves the prompt from the prompts and greeting memory 80 and forwards same with instructions to play it, via the data bus 58, to the MTL unit 52. A voice interface channel within an MTL unit 52 decodes the received speech and plays it out onto the voice bus 56 through the DTL unit 50 to the particular T1 voice channel established for this caller and consequently to toll switching office 26 for routing to the caller. The welcome prompt, illustratively, may announce:

"Welcome to the Nortel voice card service.

For introductory information on this service, press 1.

To send a voice card message, press 2.

To check the status of voice card message, press 3.

For service in Spanish, press 4. (audio is Spanish translation)"

Once the caller inputs a selection, the DTMF signaling is collected and decoded by the MTL unit 52, and it transmits the corresponding value to the IVR process 84 which provides it to the capture/query call flow 86 to continue processing.

In step 102, based on the caller's inputted selection of either 1, 2 or 3, the capture/query call flow 86 may respectively: present an introduction to the caller, step 104; process the call as a status query, step 106; or proceed to capture a new voice card message, step 107. In the event that the caller specified service in Spanish, by selecting 4, the call flow 86 may set a flag indicating which language of prompts are to be utilized, now noting to index the Spanish language prompts in the prompts and greetings memory 80 and repeats execution of step 100. In our example, English had been selected as the default language at system initialization.

It is noted that the call flow in respect of status querying will be described later, subsequent to illustrating the delivery process of pending voice card messages from which a better understanding of the various status categories will be gained.

In step 104, to present an introduction message the call flow 86 would provide the message to the IVR process 84 and command it to effect such, through the MTL units 52 as previously described, and upon receiving notification therefrom that playing of the introduction message is complete, the capture/query call flow 84 returns to step 100. The introduction may be simply a brief description of the features of the voice card system and how it may be used.

In step 107, the capture/query call flow 86 begins executing the logic to capture a new voice card message by first determining if a special occasion offering should be made. The call flow 86 reviews the special occasion field in the data files stored in the prompt and greetings memory 80 and if blank, signifying no approaching special occasion, then execution proceeds to step 114.

However, if this field does contain a reference to an upcoming occasion, in step 108, the capture/query call flow 86 will prompt the caller as to whether he/she is interested in selecting a greeting which relates to the particular special occasion that is approaching, and requests the caller to respond with a voice command. It does so by providing the special offering prompt and instructions to receive a voice command to the IVR process 84, which requests the MTL unit 52 to play the prompt and forward the received voice command input to the SRP unit 60 for processing. An example of a special occasion offering presented to a caller accessing the voice card service at a date near the beginning of April may be:

"Do you wish to send an Easter greeting?

Please respond by saying YES or NO."

The IVR process 84 upon receiving the caller's response from the SRP unit 60 provides the response to the call flow 86 which, at step 110, decides to advance to step 112 for a YES response or to step 114 for a NO response.

In step 112, the call flow 86 prompts the caller to select one of various greetings relating to the pending special occasion, such as Easter, by commanding the IVR process 84 to play a menu of greeting and receive a DTMF input. An example of this menu relating to Easter is:

"For an Easter Bunny greeting press 1.

For an Easter Duckling greeting press 2"

The caller's input is returned by the IVR process 84 to the call flow 86 which then stores the name of selected greeting and category in a memory buffer 90.

Thereafter, in step 114, the call flow 86 queries the caller to confirm that the selected greeting is the one to be sent. An illustrative prompt that the IVR process 84 may play is:

"To send this greeting press 1.

To review other greetings press 2."

The results returned by the IVR process 84 are evaluated, in step 116, by the call flow 86. If confirmation is received, by the caller inputting a "1", execution of the call flow 86 proceeds to step 120, or otherwise execution returns to step 114 whereby the entire menu of available greetings is replayed.

If at step 110 the capture/query call flow 86 realizes a negative response was received to the special occasion offering, in step 114, the call flow 86 presents the caller with a hierarchy of menu options beginning by playing, via the IVR process 84, a main menu of category options such as:

"For birthday greetings, press 1.

For get well greetings, press 2.

For cheer up greetings, press 3."

Depending upon the caller's selection, the next menu level may present either a list of greetings or a list of subcategories relating to the main selection. For example, had the caller selected birthday greetings, the next menu may comprise the following subcategory options:

"For adult male birthdays, press 1.

For adult female birthdays, press 2.

For children birthdays, press 3."

Again, the selection of the caller at this menu level may take the service to a lower level of subcategory options or of greetings. The hierarchy of menus may be readily structured to suit a particular application of the voice card service.

Once the caller selects a certain greeting, at step 118, the call flow 86 instructs the IVR process 84 to query the caller to confirm the selection, similarly to execution at step 116. If the caller chooses to send the last selected greeting, execution continues at step 120. Otherwise, the call flow 86 may return the caller to an appropriate level within the hierarchy of menus.

In step 120, the capture/query call flow 86 instructs the IVR process 84 to prompt the caller for a personal introduction. Such involves, as described above, the IVR 84 controlling the MTL unit 52 to play a suitable prompt and to capture the caller's speech. The captured speech is then provided by the IVR process 84 to the call flow 86 who stores it in a memory buffer 90. In step 122, execution is similar to that of step 120 except now the call flow 86 prompts the caller for a personal good-bye. When the voice card message is presented to the intended recipient, the captured introduction and good-bye will encapsulate the selected greeting thereby attaching a more personal character to the voice card which the recipient may appreciate.

In decision step 124, depending upon the caller's response at step 108, if the caller selection relates to the special occasion then execution proceeds to step 126 and otherwise to step 130.

As the exact date of a special occasion, like Easter, is already known to the voice card system (stored in the special occasion date field in the data file within the prompt and greeting memory 80), it is not necessary to request the caller to enter it. However, in some situations, the caller may desire not to have the voice card message delivered precisely on the day of the special occasion. Therefore, at step 126, the call flow 86 instructs the IVR process 84 to play a prompt detailing the default delivery schedule for a special occasion message and requesting confirmation from the caller. An example of a prompt for an Easter message (1995 calendar year) is:

"Would you like your greeting to be delivered on Easter day, April 17, in the morning? Please say YES or NO."

The call flow 86, in step 128, receiving the caller's response from the IVR process 84, advances processing to step 138 for a YES response or to step 130 for a NO response.

In step 130, the capture/query call flow 86 instructs the IVR process 84 to prompt and receive DTMF inputs specifying the month of delivery for the voice card message. The caller is presented with the option of having immediate delivery, say by pressing a "0", or to enter the numeric value corresponding to the month desired, for example, "1" for January, "2" for February, etc.

In step 131, the call flow 86, determines whether immediate delivery was selected by the caller and if so, the present date and time is stored in a memory buffer 90 and execution advances to step 138.

Otherwise, execution continues through successive steps 132 and 134, wherein the caller is requested to enter the day and time of delivery, respectively. The date may be specified by simply inputting its numeric digits. The time may be specified in terms of time periods within the day, for example:

"For morning press 1.
For afternoon press 2.
For evening press 3."

Morning delivery may be initiated after 8:00 am, afternoon delivery may begin at 1:00 PM, and evening delivery may be after 6:00 PM. The date and time specified together with the month enter at step 130 are stored in a memory buffer 90

In step 136, the call flow 86 has the inputted delivery schedule played back to the caller who is then requested to confirm, by a voice command response, whether it is correct. If a NO is received, the call flow 86 returns to step 130 and for a YES response execution continues on to step 138.

At step 138, the call flow 86 initiates prompting the caller to enter the recipient's telephone DN, and subsequent thereto, in step 140, the recipient DN is played back to the caller to confirm it's correctness. For a negative confirmation, the call flow re-executes step 130 and otherwise execution advances to step 142. The recipient's DN is stored in a memory buffer 90.

In steps 142 and 144, the capture/query call flow 86 has the caller prompted to speak, respectively, the name of the recipient and the caller's name, which are captured and stored in memory buffers 90.

In step 145, the capture/query call flow 86 initiates prompting the caller to select a method of payment for utilization of the service. Alternative billing options include to regular telephone account, calling card, credit card and cash (debit) card. If regular billing is selected, the caller's DN is taken from the information contained in the "incoming call" message and stored in a memory buffer 90. Otherwise, the call flow continues to prompt the caller for further information which is a function of the selected payment method. The further information collected is stored in a memory buffer 90.

The call flow 86, in step 146, has now completed capturing all necessary information which is combined to form a voice card message record that is stored in a database ready for subsequent delivery. The record includes: the voice card message having the caller's name, the recipient's name, the personal introduction, selected greeting and personal goodbye; the caller's DN which is taken from information contained in the "incoming call" message; the recipient's DN; the specified date and time for delivery of the message; and the payment method selected together with any relevant data. Furthermore, the record includes a status field which indicates delivery as being one of: pending (i.e., the system is still trying to deliver the voice card), delivered (i.e., the system has successfully delivered the voice card), cancelled (i.e., the voice card has been cancelled, probably by the sender using the voice card query service), refused (i.e., the recipient when offered the voice card, refused to accept it), or expired (i.e., after a maximum number of delivery attempts, the system still could not reach the recipient, probably because of ring-no-answer or busy). Associated with each particular status is a time parameter which is uniquely relevant to that status. A pending status includes the time for the next delivery attempt. A delivered status includes the time at which the delivery was successful. A cancelled status includes the time at which the cancellation occurred. A refused status includes the time at which the refusal occurred. An expired status includes the time of the last delivery attempt. Also maintained is an attempts field which holds a count of unsuccessful delivery attempts.

The capture/query call flow 86 initializes the status field to reflect pending together with the caller specified date and time for delivery, and the attempts field is initialized to zero. The call flow 86 transmits the voice card message record and appropriate instructions over the data bus 58 to the IOP unit 64, which in turn sends the record over the LAN 30 to the storage node 28 where it is, added to a database of such records pending delivery.

In step 148, the call flow 86 prompts as to whether the caller is interested in cycling through another voice card message capture/query session. If the caller's response is affirmative, execution of the call flow 86 returns to step 100.

Otherwise, in step 150, the call flow 86 presents the caller with a farewell announcement which includes a confirmation number that may be used to identify the voice call message when querying the service for its status. The confirmation number, preferably, is the caller's DN. The capture/query call flow then terminates the call by initiating a call hang-up through the protocol handler 70, in a conventional manner, with the PSTN 10. The capture/query call flow advises the call manager 74 of the call termination and the call manager 74 then requests the session manager 76 to deallocate this instance of the capture/query call flow 86 and deallocate the memory buffers 90 to be available for use by other call flows.

Referring back to FIG. 3, next will be illustrated how delivery of captured voice card messages is implemented. The scheduler 72 periodically queries the storage node, as previously described, for voice card message records having a status of undelivered, and a delivery date and time which are earlier than the date and time of the query. Upon receiving a positive response which includes an identifier of any record containing a voice card message ready for delivery, the scheduler 72 subsequently notifies the call manager 74 accordingly. The call manager 74 requests the session manager 76 to allocated a new delivery call flow 88 instance together with a sufficient amount of memory buffers 90. The call manager 74 then provides the record identifier to that instance of the delivery call flow 88 which initiates execution.

Figure 5A:
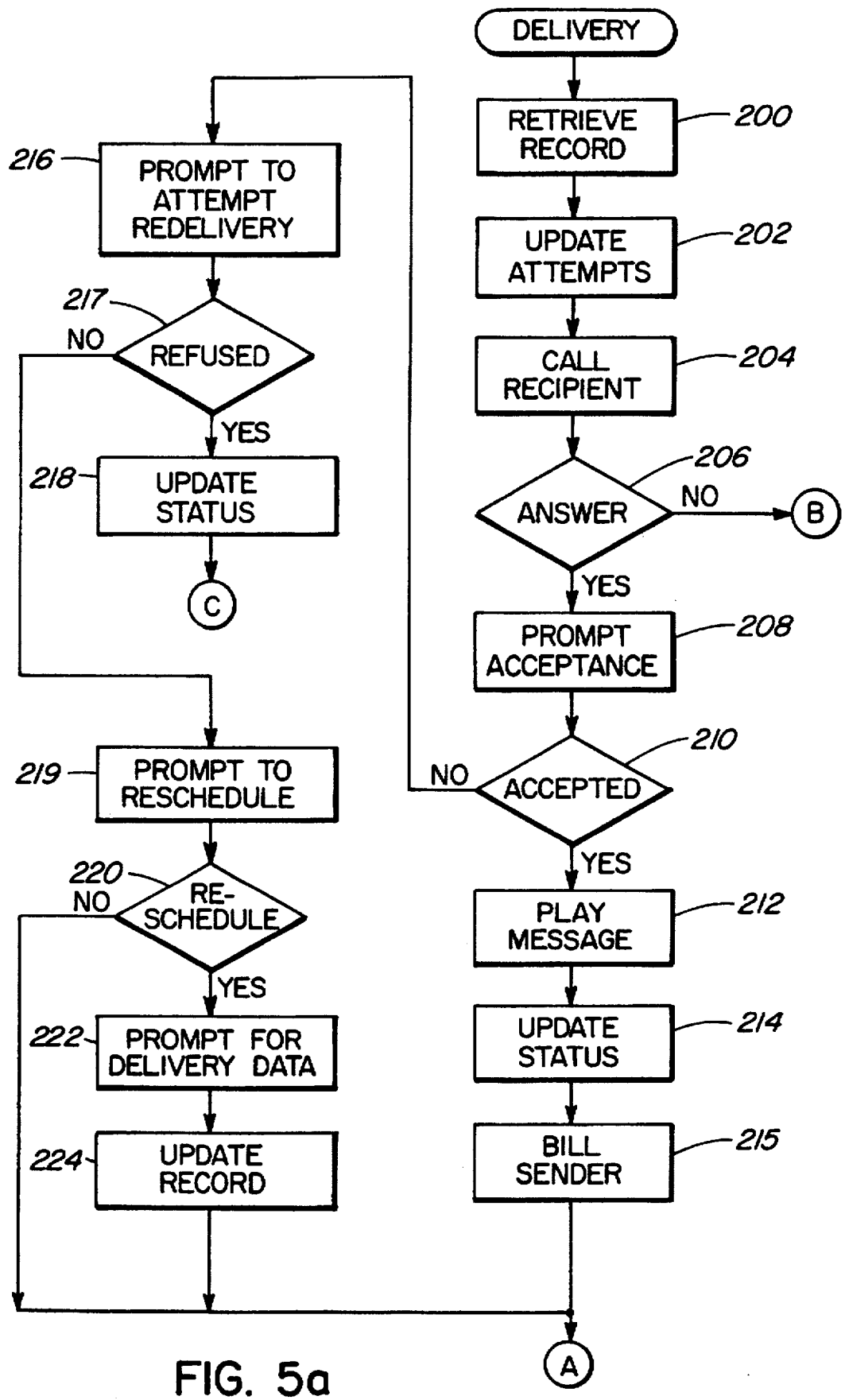
FIGS. 5a and 5b are flow charts manifesting the method of delivering a voice card message.
Figure 5B:
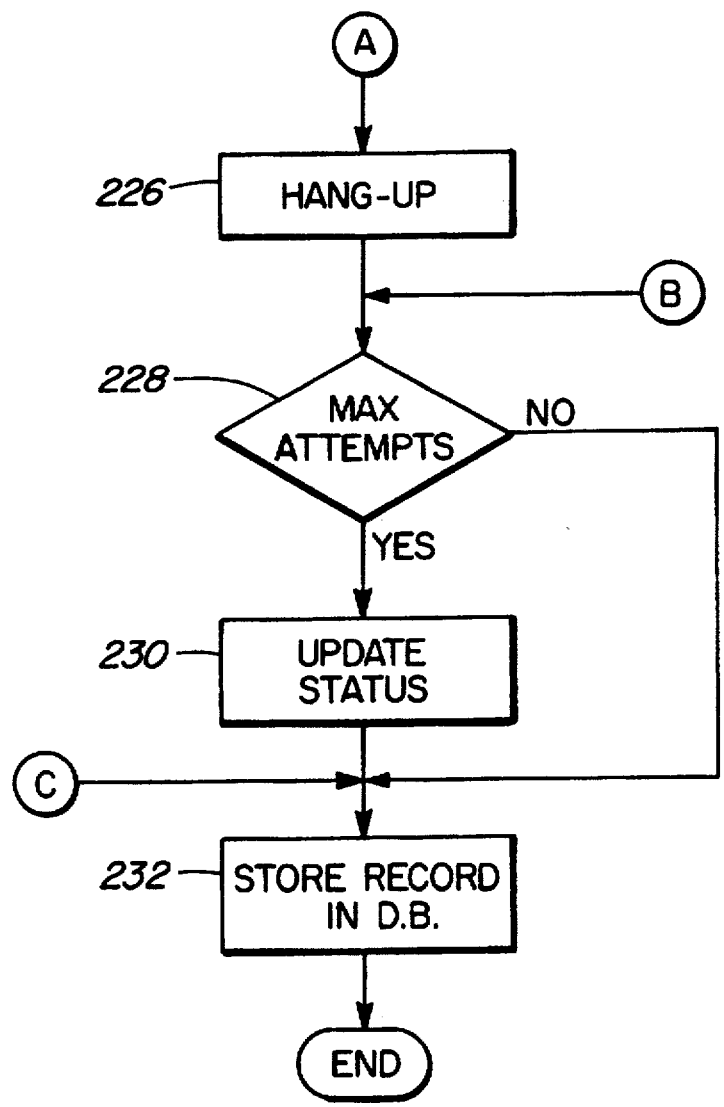

Having regard to FIGS. 5a and 5b in conjunction with FIG. 3, it is noted that the steps executed to deliver a voice card message will be described in relation to the delivery call flow 88 only, without making reference to the IVR process 84 to effect playing out prompts and the greeting and collecting inputs. Where interaction between the IVR process 84 and the call flow 88 is required should be apparent from the above description.

In step 200, the delivery call flow 88 transmits the record identifier together with an instruction to retrieve the corresponding record over the data bus 58 to the IOP unit 64 which, through the LAN 30, queries the storage node 28 accordingly and retrieves the specific voice card message record. The record is written into a memory buffer 90 that was allocated to the call flow 88.

The delivery call flow 88, in step 202, increments by a count of one the value in the attempts field within the record, thereby recording the present attempt at delivering the voice card message.

In step 204, the call flow 88 provides the recipient's telephone DN, taken from the voice card message record, together with instructions to initiate an "outgoing call" to the protocol handler 70 which then interacts with, the toll switching office 26 within the PSTN 10 (FIG. 1). The protocol handler 70 transmits an appropriate "outgoing call" message, in accordance with convention, through an MTL unit 52 and DTL unit 50 on an available T1 data channel to the toll office 26, whereby a connection is established between the toll switching office 26 and the service controller 14 on a voice channel within the T1 link 22. The toll switching office 26, having been given the recipient's DN by the protocol handler 70, begins to route the call through the PSTN 10 to a local switching office 34 which rings the telephone set 42 of the recipient.

From step 206, the delivery call flow 88 either proceeds to step 208 if the call is answered at the recipient's end and, otherwise, to step 228 when not answered which may be based on a predetermined time-out period (i.e., number of rings) or busy.

In step 208, the delivery call flow 88 begins interacting with an answering party at the recipient's end by playing an introductory announcement which includes the caller's name and the recipient's name taken from the voice card message record, and prompting to confirm that the call has been answered by the intended recipient. The introduction prompt, illustratively, may announce:

"Hello. I have a voice card greeting from <caller's name> for <recipient's name>. Please ask <recipient's name> to come to the phone and say YES to receive the greeting. If <recipient's name> is not available, say NO."

The call flow 88 waits for a response and may repeat the introduction prompt if necessary. Execution advances to step 212 for a positive (YES) response and to step 216 for a negative (NO) response.

In step 212, the delivery call flow 88 effects the playing out to the recipient of the voice card message which includes the personal introduction, greeting and personal good-bye. Playing of message may be repeated before the call flow 88 proceeds to step 214 wherein it updates the status field within the voice card message record to reflect the successful delivery which includes noting the date and time that the message was delivered.

In connection with a successful delivery, in step 215, the delivery call flow 88 then retrieves from the voice card message record the specified payment method with related data which it provides to the protocol handler 70 with an instruction to effect billing. The protocol handler 70 transmits an appropriate "billing" message containing the billing data over a T1 data line to the toll node 26 which is equipped with conventional means to process billing of telephony services. The delivery call flow 88 then advances its execution to step 226.

At step 216, to which execution proceeds from step 210 when delivery of the voice card message is not accepted by the answering party at the recipient's end, the call flow 88 prompts whether an attempt to redeliver the message should be made at a future point in time. The prompt may be along the lines of:

"Would you like us to try to deliver the voice card later?".

In step 217, the delivery call flow 88 receives the answering party's reply and either proceeds to step 218, if the reply is negative signifying that the answering party does not desire to ever receive the message, or to step 219, if the reply is positive.

In step 218, the status of the record is marked as refused and execution proceeds to step 232. No further attempts are made to deliver messages having a status of refused.

In step 219, the delivery call flow 88 prompts the answering party with an offer for him/her to specify when redelivery is to be attempted. This is advantageous in that the person may be aware of a time period when the recipient will be available to accept delivery and by coordinately delivery around such time, it is more likely to be successful.

Having received the answering party's response, in step 220, the delivery call flow 88 proceeds to step 226 if the reschedule offer is declined in which case redelivery may be attempted on the next occasion that the scheduler queries the storage node. If the offer is accepted, at step 222, the call flow 88 prompts the answering party to specify a new date and/or time to reschedule delivery and, at step 224, the call flow overwrites the old delivery data contained in the voice card message record with the newly entered reschedule data.

In step 226, the call flow 88 plays out a farewell announcement and then terminates the call by initiating a call "hang-up" through the protocol handler 70, in a conventional manner, with the toll switching office 26 in the PSTN 10.

In step 228, the delivery call flow 88 compares the value of the attempts field of the voice card message record against a predetermined maximum limit. When the attempts of an undelivered message equals this limit, in step 230, the status field of the subject record is marked as expired and, consequently, further attempts to deliver such a message will not be carried out; otherwise, executed advances directly to step 232.

In step 232, the delivery call flow 88 transmits the voice card message record, including the data fields which may have been updated during the above-illustrated execution, over the data bus 58 to the IOP unit 64, which in turn sends the record over the LAN 30 to the storage node 28 where the older version already existing within the database of voice card message records is overwritten by this newer record. Lastly, the delivery call flow 88 informs the call manager 74 of the completion of its execution, and the call manager 74 then requests the session manager 76 to deallocate this particular instance of the delivery call flow 88 along with the memory buffers 90 previously allocated to it.

Now revisiting step 106 in FIG. 4a, the following illustrates the steps executed by the capture/query call flow 86 when it realizes at step 102 that the caller is interested in querying the status of a previously captured voice card message.

Figure 6:
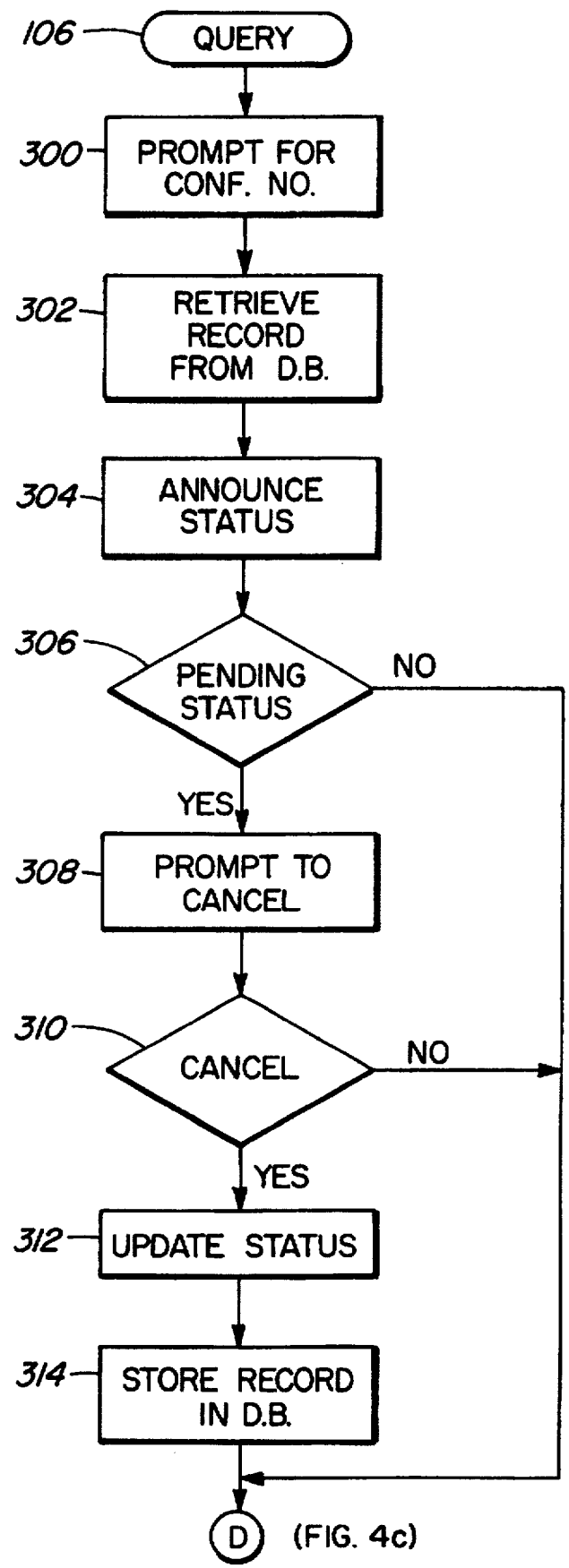
FIG. 6 is a flow chart manifesting the method to query the status of a previously captured message.

Turning to FIG. 6 in conjunction with reference to FIGS. 2 and 3, execution of the capture/query call flow 86 follows from step 106 to successive step 250, at which the call flow 86 prompts for the confirmation number associated with the voice card message for which the caller is now querying the status. The confirmation number may be the caller's telephone DN and an illustrative prompt is as follows:

"Please enter the 10 digit telephone number from which you ordered your voice card."

After the caller's DN (confirmation number) is received by the call flow 86, in step 302, it transmits that number together with an instruction to retrieve the corresponding record over the data bus 58 to the IOP unit 64 which, over the LAN 30, queries the storage node accordingly and returns the corresponding voice card message record which is written into a memory buffer 90.

The capture/query call flow 86, in step 304, reviews the status field within the record and then presents an appropriate announcement which is dependent upon whether the particular status is pending, delivered, cancelled, refused, or expired. For a pending message, the call flow 86 may include in the announcement the recipient's name and the number of attempts still outstanding which is based on the predetermined maximum number minus the value in the attempts field of the record. An illustrative announcements is:

"Card for <recipient's name> has not been delivered. <x> more attempts will be made."

For a delivered voice card message, the announcement may include the recipient's name and the date and time of delivery which were recorded in the status field. An illustrative announcement is:

"Card for <recipient's name> was delivered on <date> at <time>."

For an expired voice card message, the announcement may include the number of attempts, and the date and time of the last attempt, for example:

"Card for <recipient's name> could not be delivered successfully after <maximum> attempts. The final delivery attempt occurred <date> and <time>."

Lastly, for a voice card message having a cancelled or rejected status, the announcement may simply say such and include the appropriate time and date.

Figure 4C:
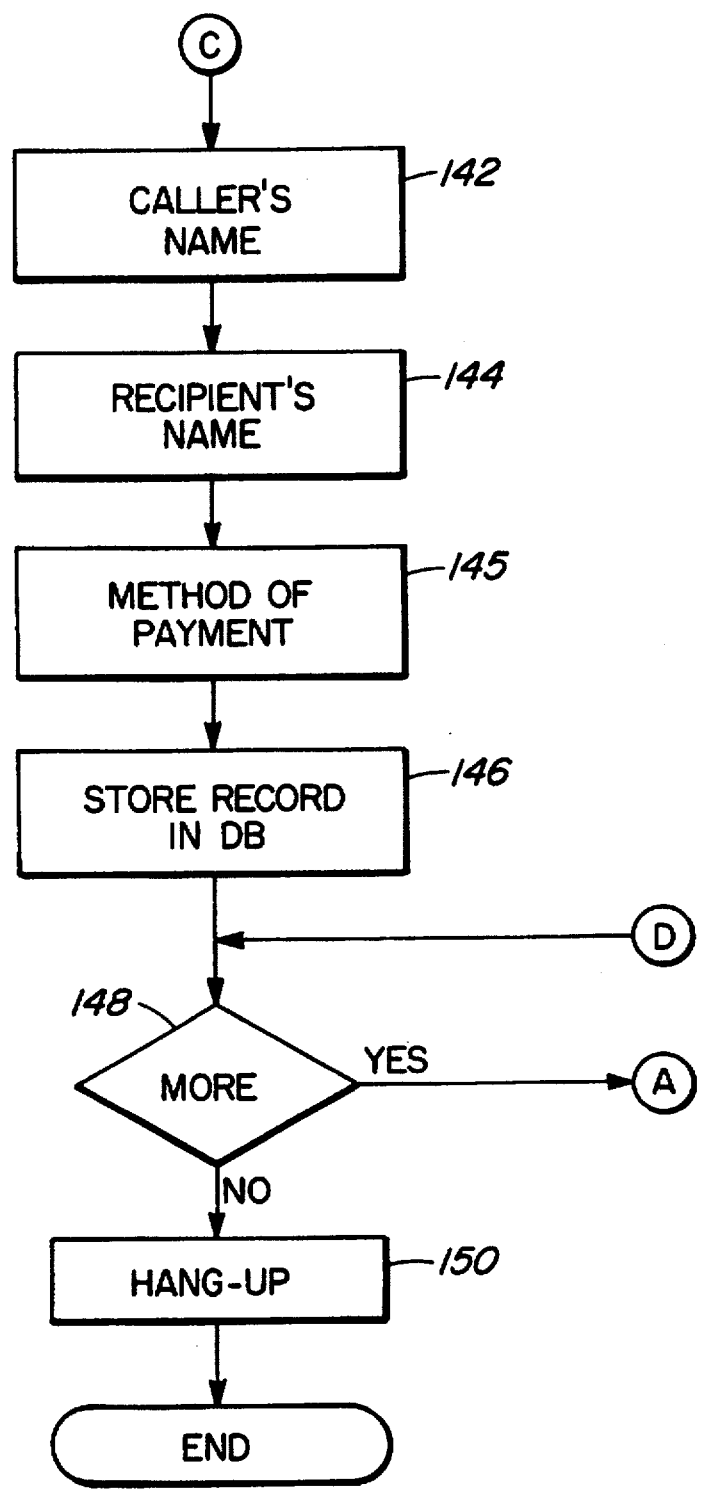

In step 306, execution of the capture/query call flow 86 then continues on to step 148 in FIG. 4c, execution from which was described above in relation to capturing a voice card message, if the status of the subject voice card message is other than pending.

Otherwise, for a message with a pending status, the capture/query call flow 86, in step 308, prompts the caller with an offer to cancel this pending message. If the caller's reply is positive, at step 312, the call flow updates the status of this message in the corresponding record to cancelled and, in step 314, has the record stored in the database. No further attempts are made to deliver cancelled messages. After step 314 or for a negative response at step 310, the call flow 86 proceeds to step 148 in FIG. 4c.

The above illustrations of user (i.e., caller or recipient) interactive sessions with the voice card system evidences the system's capabilities to accept both DTMF signaling and voice command inputs. To support users having dial pulse telephones it is possible to configure the voice card system to accept voice command responses at the various prompts throughout an entire interactive session thereby effecting automatic processing of calls, without the need for attendant assistance. Instead of requesting a user to respond by depressing a specific number key on their touch-tone (i.e., DTMF signalling) telephone, the user may be prompted to speak the number corresponding to a desired option (i.e., voice command).

There may, however, be situations where users may desire or require the assistance of an attendant. Users having DTMF signaling capabilities may request assistance at any point during an interactive session by pressing a predetermined key, such as "0" or, for dial pulse telephone users, by performing a hookflash. Also, the voice card system may automatically forward a user to an attendant for assistance in cases where the service prompted for input and the input is not received within a predetermined time-out period.

Attendant backing may be invoked by call flows, namely the capture/query and the delivery call flows 86 and 88 shown in FIG. 3, either when explicitly requested or automatically after a time-out. The call flow begins the process of transferring the user to an attendant by providing an appropriate command including a call session reference to the protocol handler 70. The call flow then transmits context information defining the state of the call session over the data bus 58 to the IOP unit 64 which forwards it over the LAN 30 to the storage node 28. The protocol handler 70 also communicates over an available T1 data channel with the toll switching office 26, according to known convention, to conference in an attendant whereby manual processing of the interactive session commences. During manual processing, the call flow has no involvement.

Referring to FIG. 1, the toll office 26 establishes a connection over T1 link 24 through the channel bank 19 with an available attendant at a station 21 and hands the call to that station along with the call session reference. The particular attendant station 21 communicates the call session reference via the toll office 26 over T1 link 20 to the attendant controller 14. The attendant controller 14 acts as a link between the attendant station 21 and the storage node 28. An interface relating to the specific voice card call session, based on the call context information (i.e., data defining the current state of the call) contained in the storage node 28, is generated by the attendant controller 14 at the attendant station 21 from which the attendant may verbally interact with the user to offer manual assistance to enter information in the session. Thereafter, the attendant disconnects with the user, who then resumes interacting with the service controller 14 to continue with automated processing of the session. The attendant services 18 are able to assist any voice card capture, delivery and status query session.

Those skilled in the art will recognize that various modifications and changes could be made to the invention without departing from the spirit and scope thereof. For instance, although the invention has been described in terms of a system interfacing with a user through audio menus and prompts, the interface may also be through visual means whereby text or graphic menus are presented on a display terminal of a telephone set and selections are made by depressing programmed softkeys. It should therefore be understood that the claims are not to be considered as being limited to the precise embodiments of the voice card system set forth above, in the absence of specific limitations directed to each embodiment.

We claim:

1. A method of operating a system for use with a telephone network to capture a message having a greeting for delivery to a recipient station, comprising the steps of:

receiving a call via the telephone network from a calling station through which a caller interacts with the system;

providing the system with a plurality of greetings which may be accessed by the caller, and in association with one or more of said greetings providing a predetermined date for delivery;

selecting by the caller the greeting in the message from the plurality of greetings;

selecting by the caller delivery of the message on either the predetermined date, if such is associated with the selected greeting, or another date;

receiving directory information of the recipient station from the caller; and delivering the message to the recipient station on the selected date.

2. A method as claimed in claim 1, comprising the steps of recording a first speech of the caller, and including the recorded first speech in the message.

3. A method as claimed in claim 2, comprising the steps of recording a second speech of the caller, and including the recorded second speech in the message, wherein during delivery the recorded first speech followed by the selected greeting and then the recorded second speech are presented to the recipient station.

4. A method as claimed in claim 1, comprising presenting a menu of categories from which the caller may access related greetings.

5. A method as claimed in claim 4, comprising:

prompting whether the caller desires greetings for a particular occasion;

responsive to a positive reply, presenting a menu from which the caller directly accesses the greetings relating to that particular occasion; and responsive to a negative reply, presenting the menu of categories.

6. A method as claimed in claim 1, wherein the step of selecting the delivery date includes enabling the caller to specify a date and a time to deliver the message, and deferring delivery until the specified time on the specified date.

7. A method as claimed in claim 6, wherein the step of enabling the caller to specify the time includes inputting a particular time.

8. A method as claimed in claim 7, wherein the step of enabling the caller to specify the time includes presenting various time periods for delivery within a day, and enabling the caller to select one of the time periods.

9. A method as claimed in claim 8, wherein the step of selecting the delivery date includes:

prompting the caller with the predetermined date in connection with the selected greeting and a predetermined time;

responsive to a positive reply, utilizing the predetermined date and predetermined time as the specified date and time; and responsive to a negative reply, enabling the caller to input the particular date and either the particular time or time period.

10. A method as claimed in claim 1, wherein the step of delivering the message includes:

providing the directory information to the telephone network in order to establish a call with an answering party at the recipient station;

prompting the answering party to accept delivery of the message;

responsive to a positive reply, presenting the message; and responsive to a negative reply, attempting another delivery.

11. A method as claimed in claim 10, comprising the step of recording speech from the caller identifying the caller and identifying the recipient, and wherein the step of prompting the answering party to accept delivery includes presenting the speech identifying the caller and the recipient to the answering party.

12. A method as claimed in claim 10, wherein the step of attempting the another delivery includes enabling the answering party to specify a date and time to attempt the another delivery, and deferring the another delivery until the specified time on the specified date.

13. A method as claimed in claim 12, wherein the step of attempting the another delivery includes:

prompting whether the answering party desires to specify when to attempt the another delivery;

responsive to a positive reply, enabling the answering party to specify the date and time; and responsive to a negative reply, attempting the another delivery on a predetermined periodic time basis.

14. A method as claimed in claim 1, wherein the step of delivering the message includes:

providing the directory information to the telephone network in order to establish a call with an answering party at the recipient station;

prompting the answering party to accept delivery of the message;

responsive to a positive reply, presenting the message; and responsive to a negative reply, enabling the answering party to select whether to attempt another delivery.

15. A method as claimed in claim 14, wherein the step of enabling the answering party to select whether to attempt another delivery includes:

prompting whether to attempt the another delivery;

responsive to a positive reply, enabling the answering party to specify a date and time to attempt the another delivery, and deferring the another delivery until the specified time on the specified date; and responsive to a negative reply, indicating the message as having a rejected status whereby no further deliveries are attempted.

16. A method as claimed in claim 14, wherein the step of enabling the answering party to select whether to attempt another delivery includes:

prompting whether to attempt the another delivery;

responsive to a positive reply, attempting the another delivery on a predetermined periodic time basis; and responsive to a negative reply, indicating the message as having a rejected status whereby no further deliveries are attempted.

17. A method as claimed in claim 1, comprising the steps of associating a status and an identifier with the message, providing the identifier to the caller, and enabling the caller to query for the status of the message associated with the identifier.

18. A method as claimed in claim 17, comprising the step of enabling the caller to cancel delivery of the message associated with the identifier and a status of pending delivery.

19. A method as claimed in claim 10, comprising the steps of receiving a request for manual assistance from either of the caller and the answering party and, responsive thereto, commanding the telephone network to conference an attendant into the call and providing context information relating to the call to the attendant.

20. A method of operating a system for use with a telephone network to capture a message having a greeting for delivery to a recipient station, comprising the steps of:

receiving a call via the telephone network from a calling station through which a caller interacts with the system;

providing the system with a plurality of greetings, which include one or more greetings corresponding to a particular occasion for which a predetermined date for delivery is provided;

prompting whether the caller desires greetings for the particular occasion;

responsive to a positive reply, presenting a menu from which the caller directly accesses the one or more greetings relating to that particular occasion;

responsive to a negative reply, presenting a menu of categories from which the caller may access related ones of the plurality of greetings;

selecting by the caller the greeting in the message from the accessible greetings;

receiving directory information of the recipient station from the caller; and delivering the message to the recipient station.

21. A system for use with a telephone network to capture a message having a greeting for delivery to a recipient station, comprising:

means for receiving a call via the telephone network from a calling station through which a caller interacts with the system;

a plurality of greetings which may be accessed by the caller. one or more of said greetings having a predetermined date for delivery;

means for selecting by the caller the greeting in the message from the plurality of greetings;

means for selecting by the caller delivery of the message on either the predetermined date, if such is associated with the selected greeting, or another date;

means for receiving directory information of the recipient station from the caller; and means for delivering the message to the recipient station on the selected date.

22. A system for use with a telephone network to capture a message having a greeting for delivery to a recipient station, comprising:

means for receiving a call via the telephone network from a calling station through which a caller interacts with the system;

a plurality of greetings, which include one or more greetings corresponding to a particular occasion having a predetermined date for delivery;

means for prompting whether the caller desires greetings for the particular occasion;

means, responsive to a positive reply, for presenting a menu from which the caller directly accesses the one or more greetings relating to that particular occasion;

means, responsive to a negative reply, for presenting a menu of categories from which the caller may access related ones of the plurality of greetings;

means for selecting by the caller the greeting in the message from the accessible greetings;

means for receiving directory information of the recipient station from the caller, and means for delivering the message to the recipient station.

* * * * *